INVENTOR.
JOSEPH J. LOVINGHAM
BY Thomas W. Brennan

Dec. 2, 1969    J. J. LOVINGHAM    3,481,543
ROCKET THRUST NOZZLE

Filed Dec. 18, 1967    3 Sheets-Sheet 2

INVENTOR.
JOSEPH J. LOVINGHAM
BY

Dec. 2, 1969  J. J. LOVINGHAM  3,481,543
ROCKET THRUST NOZZLE
Filed Dec. 18, 1967  3 Sheets-Sheet 3

INVENTOR.
JOSEPH J. LOVINGHAM
BY Thomas H. Brennan

United States Patent Office 3,481,543
Patented Dec. 2, 1969

3,481,543
ROCKET THRUST NOZZLE
Joseph J. Lovingham, Madison, N.J., assignor to Thiokol Chemical Corporation, Bristol, Pa., a corporation of Delaware
Filed Dec. 18, 1967, Ser. No. 691,277
Int. Cl. B64d 33/04
U.S. Cl. 239—127.3                                5 Claims

ABSTRACT OF THE DISCLOSURE

The wall of a rocket thrust nozzle is formed of a plurality of nested, coaxial rings each having a plurality of passages extending therethrough. Coolant forced through the aforesaid passages controls the temperature of said rings.

---

This invention relates to rocket motors and more particularly to a rocket thrust nozzle having improved means for cooling the throat thereof.

A difficult problem encountered in the operation of a rocket motor is the prevention of erosion of the orifice of the thrust nozzle thereof by high-temperature thrust gas, particularly at the nozzle throat where it is desirable to maintain a constant cross-sectional area. Since the material of which the throat of a nozzle is formed becomes less resistant to the destructive effects of thrust gas at higher temperatures near its melting point, the throats of nozzles have heretofore been provided with porous inserts through which coolant is forced during the operation of the rocket motors with which the nozzles are used. However, it has been found difficult to control the porosity of the various metallic and ceramic materials commonly employed in the fabrication of such nozzle throat inserts, with the result that a precise determination of the conditions (such as coolant injection pressure) required to cool even those inserts made of the same material cannot readily be made. Furthermore, many of the porous materials commonly used for nozzle throat inserts are difficult to form with conventional machine tools.

It is accordingly an object of this invention to provide improved means for cooling the wall of a rocket thrust nozzle.

Another object of the invention is to provide thrust nozzle cooling apparatus that is inexpensive to manufacture and effective in operation.

A further object of the invention is to provide thrust nozzle cooling means the construction of which can conveniently be varied to provide different heat transfer conditions.

The aforementioned objects are attained by forming the throat of a rocket thrust nozzle with one or a plurality of nested rings surrounded by an annular chamber, said rings being in the form of hollow, truncated cones which are readily manufactured by conventional techniques, including machining, casting, milling and the like, and which can be interlocked to form a wall having high structural stability. In a preferred embodiment of the invention that will be described in detail hereinafter, rings having a plurality of generally longitudinally extending slots formed in their aft surfaces are employed, thus simplifying the arrangement of flow passages through the wall of a thrust nozzle.

Figure 1:
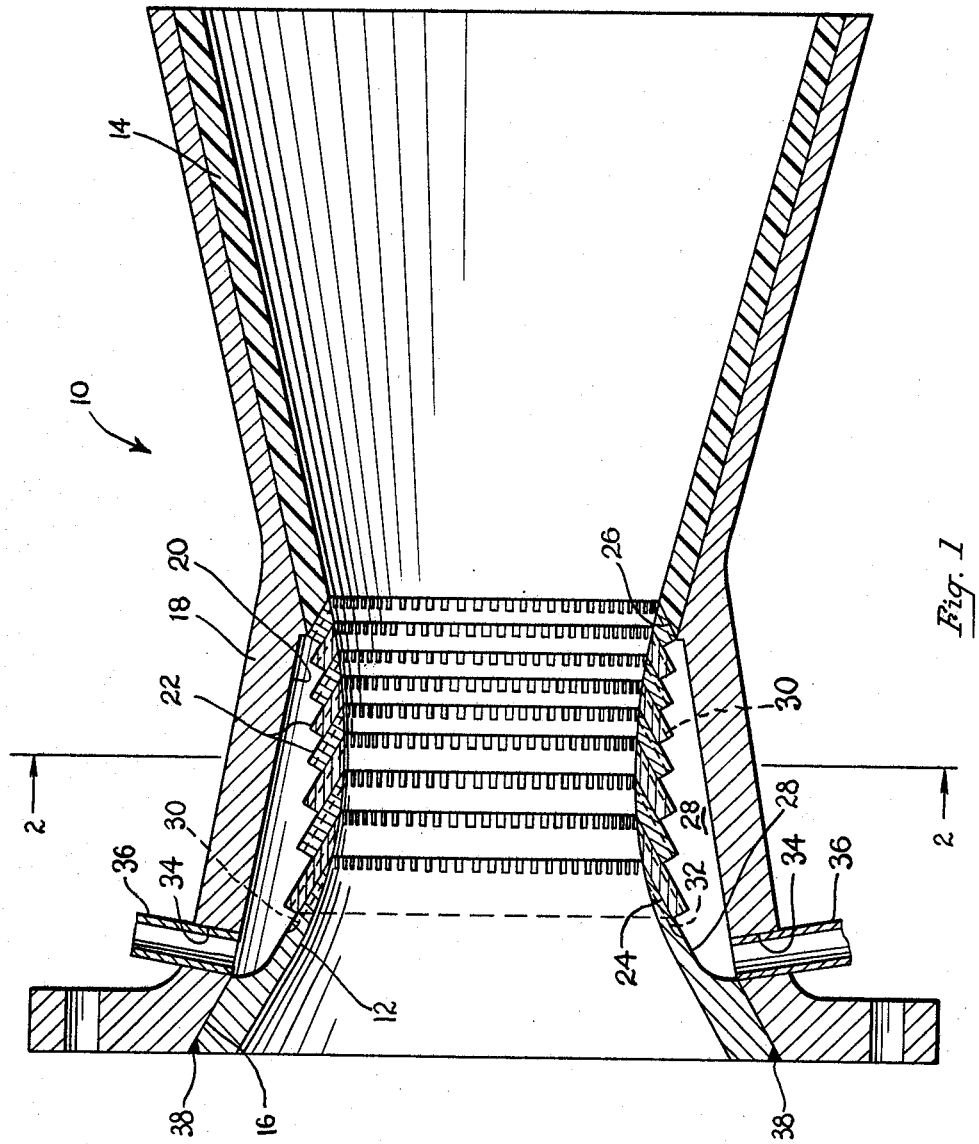
Figure 2:
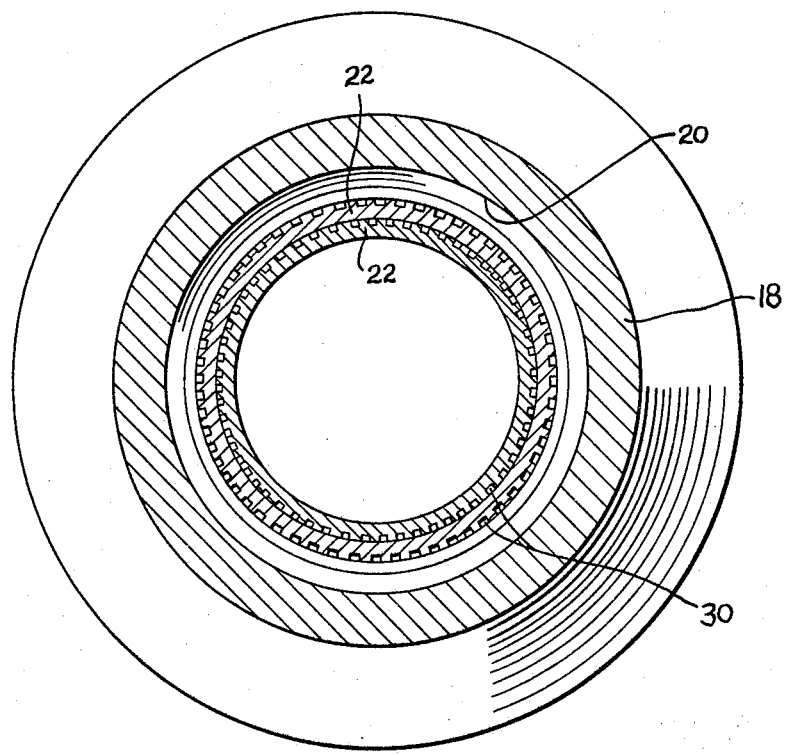
Figures 3, 4:
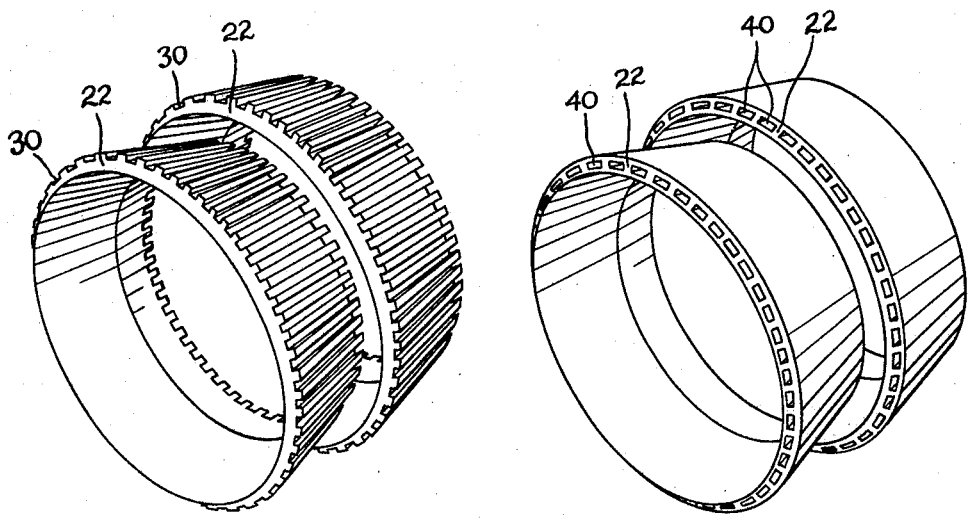
Figure 5:
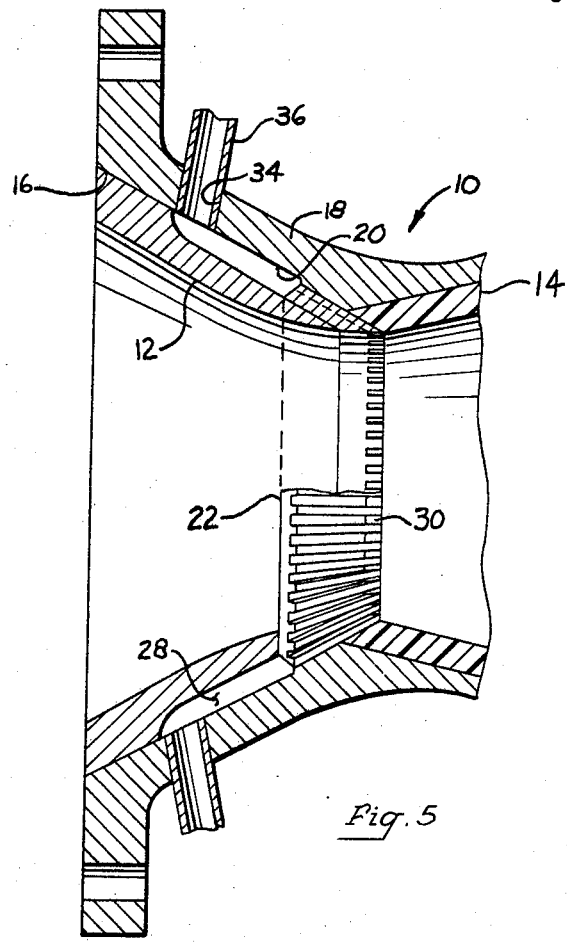
Figure 6:
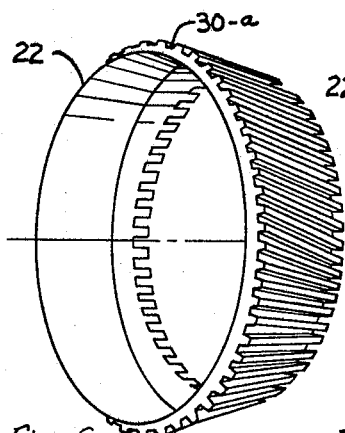
Figure 7:
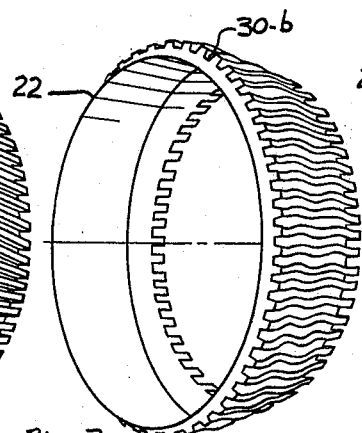
Figure 8:
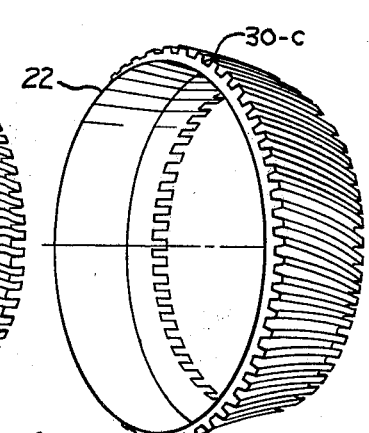

In the accompanying drawings:
FIGURE 1 is a sectional view taken along the longitudinal axis of a rocket thrust nozzle constituting a preferred embodiment of the invention;
FIGURE 2 is a cross-sectional view of the same nozzle, taken along the plane represented by line 2—2 of FIGURE 1 and in the direction indicated on that drawing;
FIGURE 4 is a perspective detail view of two of a plurality of tapered rings employed in the preferred embodiment of the invention;
FIGURE 3 is a perspective detail view of two of a employed in another embodiment of the invention;
FIGURE 5 is a partial sectional view similar to FIGURE 1 wherein a single ring is shown and further broken away to illustrate the flow passages therein; and
FIGURES 6, 7 and 8 are perspective detail views of single rings which when employed in the invention constitute additional embodiments thereof.

Throughout the specification and the drawings, like reference numbers refer to like parts.

In FIGURE 1 is illustrated a rocket thrust nozzle 10 comprising annular forward and aft walls 12, 14 which respectively form convergent and divergent portions of the nozzle. Forward wall 12 is formed with a relatively thick forward section the outer surface of which matingly engages a chamfer 16 on the inner surface of an annular outer housing 18, and with a thinner aft section that projects inwardly from the inner surface 20 of housing 18 which is intermediate forward wall 12 and aft wall 14. In the described embodiment of the invention, aft wall 14 is a layer of ablative material bonded to the inner surface of the aft section of housing 18, but in other embodiments aft wall 14 may be formed of a suitable metal and the aft section of housing 18 may be omitted.

A plurality of rearwardly convergent rings 22 are disposed in nested, tandem relation between forward and aft walls 12, 14, the inner surface 24 of the forward ring abutting the aft outer surface of forward wall 12 and the outer surface of the rearmost ring abutting the forward end surface 26 of aft wall 14. Rings 22 are spaced from surface 20 of housing 18 to provide an annular chamber 28 therebetween. It is to be understood that the invention is not limited with respect to the number or location of rings 22 in a rocket thrust nozzle, since the illustrated arrangement can obviously be modified to extend or shorten the portion of the wall of thrust nozzle 10 that is formed by the rings.

Illustrated by broken lines in FIGURE 1 (and shown more clearly in FIGURES 2 and 3) are a plurality of circumferentially-spaced slots 30 which extend generally longitudinally of the outer surface of each ring 22 and which provide flow passages communicatively connecting chamber 28 with the orifice of thrust nozzle 10. A plurality of circumferentially-spaced slots 30 also extend longitudinally of the outer surface of the thinner aft section of forward wall 12, two of these slots being illustrated by broken lines in FIGURE 1. Housing 18 is provided with at least one inlet 34 in which is fixedly positioned a conduit 36 connected to a coolant supply reservoir and associated fluid pressurizing means which are carried by the rocket motor to which thrust nozzle 10 is attached, this apparatus not being illustrated since the invention is not limited with respect to the means employed to inject coolant into the chamber 28.

When thrust gas is flowing through thrust nozzle 10, a coolant such as liquid hydrogen is forced under pressure through conduits 36 into chamber 28, and thence through slots 30, 32 into the orifice of said thrust nozzle. This flow cools forward wall 12 and rings 22 so that their temperature is maintained at a relatively low level compared to the temperature of the thrust gas flowing through thrust nozzle 10. Thus forward wall 12 and rings 22 can be made of metals, such as stainless steel, that are relatively inexpensive. It will be recognized that the form of rings 22 is such that they can readily be used as a single unit or assembled in nested relation to provide a structurally stable ring assembly that cannot shift longitudinally or laterally of the illustrated position in FIGURE 1 after forward wall 12 has been fixedly attached to housing 18, as by means of welding 38. In addition, the construction of a thrust nozzle in accordance with the invention is such that any desired rate of heat transfer between forward wall 12 and rings 22 can be provided merely by varying the size, configuration and number of slots 30, 32 in said components. Still another advantage of a thrust nozzle in accordance with the invention is that different distributions of coolant flow through the wall of a thrust nozzle can be obtained by forming a selected number of the rings 22 without slots 30, or by varying the alignment of the slots in said rings. Rings 22 can be manufactured by conventional machining by casting operations by milling including chemical milling or any other forming process such as coining, photoetching and electroforming and the like, and their size can be readily varied to provide any desired contour to the orifice of a thrust nozzle.

Many modifications can obviously be made in the arrangement of the disclosed preferred embodiment of the invention in the light of the above disclosure. For example, as illustrated in FIGURE 4, the rings 22 can be formed with longitudinal flow passages or perforations 40 which extend between the end surfaces of said rings and which thus provide flow passages communicatively connecting chamber 28 with the orifice of thrust nozzle 10. Although it is convenient to form thrust nozzle 10 with an outer housing 18 to provide an annular chamber 28 around rings 22, outer housing 18 can be omitted and a plurality of coolant supply conduits can be connected to the slots 30, 32 and 40.

In FIGURE 5 nozzle 10 is illustrative of the invention wherein single ring 22 is utilized alone being positioned between outer housing 18, aft wall 14 and forward 12 with slots 30 again providing fluid flow communication between annular chamber 28 with the orifice of thrust nozzle 10. In this embodiment milled slot 32 in forward wall 12 has been omitted, it being clear that, if desired, it can be included. A single ring 22 provides the obvious advantage of simplicity in construction and assembly and permits foreshortening of nozzle 10 and its orifice, since in some applications a shorter throat and nozzle will be desirable.

FIGURES 6, 7 and 8 are illustrative of single rings 22 useful in the herein described invention wherein the configuration and/or orientation of the fluid flow passages or slots 30 is modified to obtain a particular flow condition or effect. Thus in FIGURE 6, slots 30a are substantially straight but formed in the periphery of ring 22 in a skewed or twisted configuration with respect to the nozzle longitudinal axis whereby fluid entering the orifice of nozzle 10 has imparted thereto a swirling motion for more efficacious cooling of wall 14. In FIGURE 7 slots 30b are formed so as to have a varying cross sectional area throughout their length to provide still another flow condition upon entry of fluid therefrom into the orifice or nozzle 10. FIGURE 8 is an illustration of still another form of ring 22 wherein slots 30c are skewed or twisted with respect to the longitudinal axis of said motor, as in FIGURE 6 but are curved as well.

Having illustrated the invention in preferred and additional embodiments it should be apparent that what has been presented to the art of rocket motors is a rocket motor having an improved cooling means for the throat thereof. Obviously with respect to the form of the fluid passages, many other configurations and orientations thereof will occur to those skilled in the art, as for example, forming the slots 30, 40 and 30a, 30b and 30c in helices or with a taper.

What is claimed is:

1. A rocket thrust nozzle comprising an annular housing, annular forward and aft walls forming convergent and divergent portions of said nozzle in said housing; a cooled throat fixedly positioned between said walls comprising; at least one tapered ring extending in nested relationship between said walls defining therewith and a portion of said housing an annular fluid containing chamber, said ring formed with a plurality of circumferentially spaced flow passages connecting said annular chamber and the interior of said thrust nozzle through said throat; and means for forcing fluid from said chamber through said flow passages of said ring.

2. A rocket thrust nozzle as defined in claim 1 wherein said flow passages are slots formed in the outer surfaces of said rings.

3. The nozzle of claim 1 wherein said passages are skewed with respect to the longitudinal axis of said nozzle.

4. The nozzle of claim 1 wherein the cross sectional area of said passages is varied in at least a portion of their length.

5. A rocket thrust nozzle comprising:
an annular housing, annular forward and aft walls and a portion of said housing intermediate thereto; means defining a cooled throat for said nozzle comprising:
 a plurality of tapered rings extending in nested, tandem relation between said forward and aft walls and spaced inwardly of said housing portion intermediate said forward and aft walls to thereby define an annular chamber between said surface and said rings, each of said rings being formed with a plurality of circumferential spaced longitudinally extending flow passages communicating said chamber with the interior of said thrust nozzle through said throat thereof; and means for forcing said coolant into said chamber and through said flow passages into said throat.

References Cited

UNITED STATES PATENTS

| | | | |
|---|---|---|---|
| 2,354,151 | 7/1944 | Skoglund | 239—127.3 |
| 2,785,878 | 3/1957 | Conrad | 239—127.3 |
| 2,957,310 | 10/1960 | Hyde | 239—265.17 |
| 2,958,194 | 11/1960 | Bayley | 239—127.3 |
| 3,233,833 | 2/1966 | Bertin et al. | 239—127.3 |

EVERETT W. KIRBY, Primary Examiner

U.S. Cl. X.R.

239—265.17, 265.23